Nov. 28, 1933.  C. C. WILLIS  1,936,651
METHOD OF DRYING MOISTENED SHEET MATERIAL
Filed Oct. 3, 1930
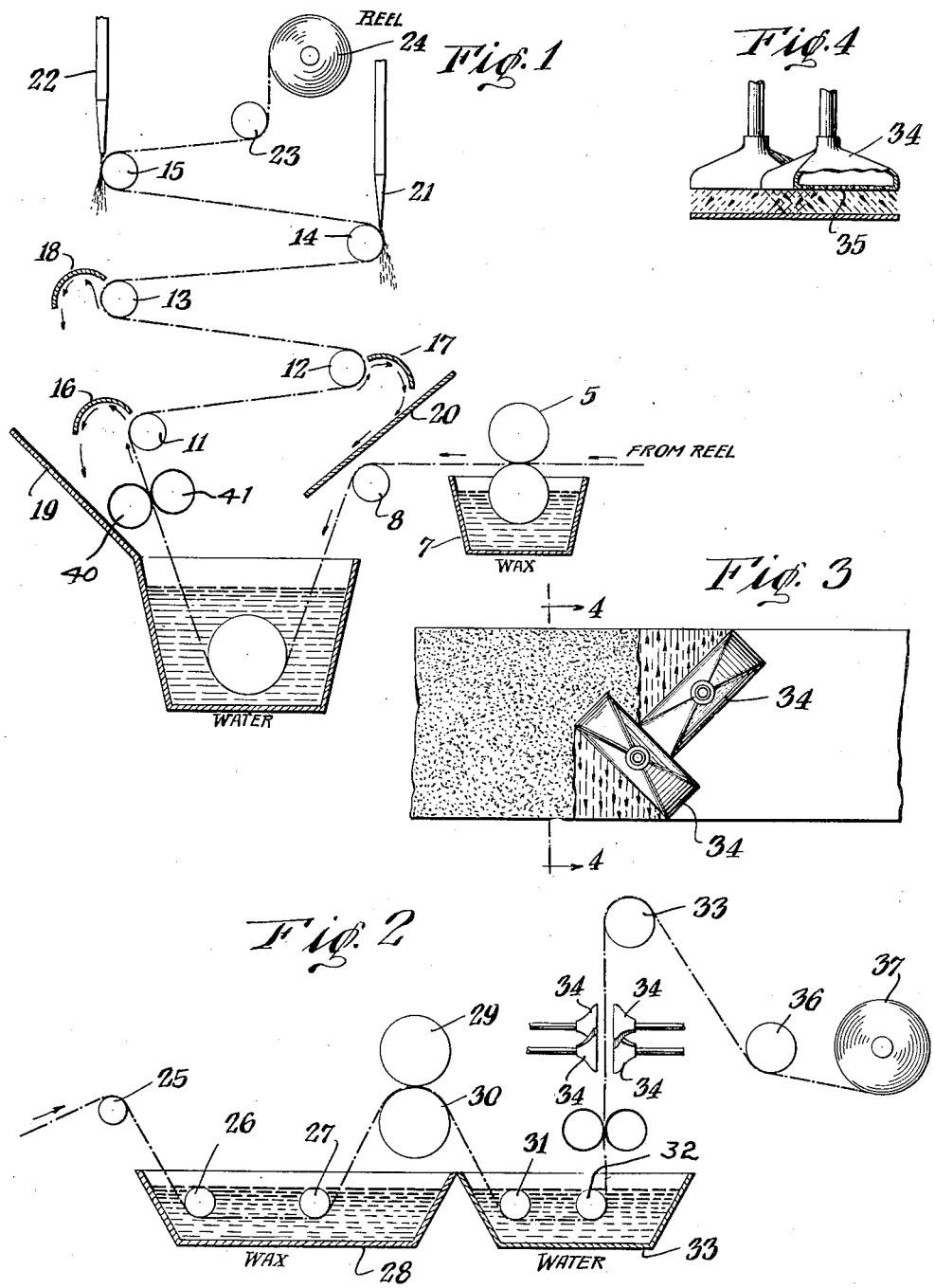

Patented Nov. 28, 1933

1,936,651

UNITED STATES PATENT OFFICE 1,936,651

METHOD OF DRYING MOISTENED SHEET MATERIAL

Charles C. Willis, New Brunswick, N. J., assignor to John Waldron Corporation, New Brunswick, N. J.

Application October 3, 1930. Serial No. 486,076

5 Claims. (Cl. 34—24)

This invention relates to methods and apparatus for coating paper with wax, and relates more particularly to the drying of paper after it has passed through a waxing bath.

According to this invention, the paper to be waxed is passed through a bath of melted wax, then through a cold water bath to harden the coating, and is dried thoroughly on its way to the reel.

In one embodiment of the invention the waxed paper on its way to the reel, after passing through the water bath, is passed between the ordinary rubber rolls to remove a portion of its moisture and then for the final removal of the moisture the paper is caused to reverse its direction of movement several times so that the remaining moisture is thrown off by centrifugal force near rollers placed at the points of change of direction, which moisture is collected and returned to the water bath.

In another embodiment of the invention, air nozzles, arranged at 45° to the line of paper travel, are provided with guides in the nozzles which direct air at 90° to the travel of the paper.

The invention will now be described with reference to the drawing, of which:

Fig. 1 is a diagrammatic view of a paper waxing machine utilizing centrifugal force and air blasts for drying the paper after waxing;

Fig. 2 is a diagrammatic view of a paper waxing machine utilizing the nozzles arranged at 45° to the paper travel and directing air at 90° to the travel of the paper;

Fig. 3 is a front view of one side of the paper with the nozzles of Fig. 2 for drying the same, and Fig. 4 is a sectional view taken along the lines 4—4 of Fig. 3.

Referring now to Fig. 1 of the drawing, the paper to be waxed is unwound from a reel (not shown) and passes in close contact with and between the rollers 5 and 6. The roller 6 has its lower portion immersed in melted wax in the basin 7 and is rotated by suitable means so as to collect wax on its surface and to impart it to the surface of the paper passing between the rollers. The roller 6 is, of course, given a width equal to or greater than that of the paper to be waxed so as to insure complete waxing of one side of the paper. The paper, after being waxed, next passes over the guide roller 8 and is directed into the water contained in the water basin 9 and passes over the roller 10 immersed in the water. The wax coating on the paper on passing through the water in the basin 9 is hardened by contact with the water.

After passing through the water in the basin 9, the waxed paper has considerable moisture adhering to it which should be dispensed with before the paper is rerolled. After leaving the water basin 9, the moistened paper is passed between the ordinary rubber covered rolls 40 and 41 which remove a portion of the moisture carried by the paper. To completely remove the remainder of the moisture adhering to the paper, it is directed over the rollers 11, 12, 13, 14 and 15 in succession, each successive roller being so placed as to cause the traveling paper to make abrupt changes of direction. Naturally, as the paper goes over the surface of each of these rollers, there is a centrifugal force exerted on the moisture adhering to the surface of the paper. This adhered moisture is thrown off at each "corner" roller, as indicated by the arrows, and at each roller is provided a baffle for collecting and guiding the moisture thrown off from the paper back into the water basin 9. At the roller 11 the baffle 16 is arranged to collect the moisture thrown off by centrifugal force at the roller 11, and in like manner the baffles 17 and 18 are arranged to collect the moisture thrown off at the rollers 12 and 13 respectively. Beneath the baffles 16 and 18, the baffle 19 is arranged to direct the moisture returned in the form of water droplets from the baffles 16 and 18 into the water basin 9. In like manner the baffle 20 is arranged under the baffle 17 to return the moisture thrown off at the roller 12 into the water basin 9.

Adjacent the "corner" roller 14 the air nozzle 21 is arranged so as to direct an air stream completely across the face of the paper in a direction opposed to the direction of movement of the paper. In like manner the similar air nozzle 22 is arranged to project a blast of air on the paper adjacent the "corner" roller 15.

The purpose of the air blasts from the air nozzles 21 and 22 is to prevent particles of water thrown off by the sheet of paper at the "corner" rollers, at which the air nozzles are placed, from falling back onto the surface of the paper. The sheet of paper in making the sharp turns tends to throw the small particles of moisture off. At the same time, however, due to the air action which is induced by the sheet, some of the thrown off particles of moisture are carried along by the air traveling close to the surface of the sheet and fall back again onto the paper. The air blasts from the nozzles 21 and 22 oppose the air streams induced by the movement of the paper and effectively remove from the vicinity of the paper the particles of water which are once thrown off by centrifugal force.

The paper, after passing the last of the air nozzles, is passed over the guide roller 23 and is rewound on the roll 24.

It should be understood, of course, that the embodiment of the invention described above is for the purpose of illustration only and that the structure there described can be changed considerably without departing from the spirit of the invention. For example, more or less of the water baffles for collecting the moisture thrown off of the paper by centrifugal force can be employed. Likewise, more or less drying air nozzles may be employed. In each instance, the requirements of a particular installation will determine the arrangement and the amount of the equipment necessary.

The embodiment of the invention illustrated by Figs. 2 and 3 of the drawing will now be explained. The paper to be waxed is unreeled from a roller (not shown) and passes first over the guiding roller 25, then over the guide rollers 26 and 27, immersed in the melted wax in the basin 28, then passes between the smoothing rollers 29 and 30 and then over the guide rollers 31 and 32 which are immersed in the water in the basin 33. The water in the basin 33 serves to harden the wax on the paper but imparts, as has previously been explained, moisture to the paper which must be removed before the paper can be rerolled. The moistened paper, after leaving the water basin 33, is caused to move along a vertical line between the guide rollers 32 and 33. As the paper moves along this vertical line, it is subjected to blasts of drying air from the air nozzles 34, there being two of these nozzles arranged, as shown by Fig. 2, on each side of the paper. These nozzles 34 are preferably arranged at about 45° to the paper travel and the guides 35, through which the air passes against the paper, are arranged with their sides perpendicular to the travel of the paper so as to direct the drying air at an angle of 90° to the paper travel. With this arrangement, one of the two nozzles on each side of the paper takes care of half of the moisture on its side of the paper and blows it towards its respective edge of the paper and at right angles to the edge so that the moisture is blown off by the two nozzles at the two edges of the paper. By having the paper move vertically past the nozzles as shown by Fig. 2, the beneficial effect of the air blast is increased since the tendency of the water to remain on the moving paper is opposed to the greatest extent by the force of gravity and it is more easily separated under such a condition from the surface of the paper by the blasts of drying air.

The paper, after passing the guide roller 33, passes over the guide roller 36 and is rerolled on the roll 37.

Obviously, the arrangement illustrated by Figs. 2 and 3 could be modified without departing from the invention. It is preferable, but not absolutely necessary, that the air nozzles be arranged along the line of vertical travel of the paper. It is not essential that this be done since the paper could travel at an angle or even horizontally, although this is not preferred. Again the number and arrangement of the air nozzles 80 can be changed to suit the requirements of the particular installation.

What is claimed is:

1. The method of drying moistened sheet material which comprises causing said material to move at such high velocity around a roller which changes the direction of movement of said material that a substantial portion of the moisture content is thrown off by centrifugal force from the material as it passes around said roller, and passing the partially dried material around a second roller at which it again changes its direction and applying a current of air to the surface of said material as it passes around said second roller.

2. The method of drying moistened sheet material which comprises passing said material at such high velocity over a plurality of guiding rollers, each of which changes abruptly the direction of movement of the material that at each roller a substantial portion of the contained moisture is thrown off by centrifugal force.

3. The method of drying moistened sheet material which comprises passing said material at such high velocity over a plurality of rollers, each of which changes the direction of movement of the material that considerable moisture is thrown off by centrifugal force, collecting the moisture thrown off by centrifugal force at one of said rollers, and applying an air stream to the material at another of said rollers.

4. The method of drying moistened sheet material which comprises passing said material at such high velocity over a plurality of guiding rollers, each of which substantially reverses the direction of movement of the material that at each roller a substantial portion of the moisture content is thrown off from the material by centrifugal force.

5. The method of drying moistened sheet material which comprises passing said material at such high velocity over a plurality of guiding rollers, each of which substantially reverses the direction of movement of said material that considerable moisture is thrown off by centrifugal force, collecting at one of said rollers the moisture thrown off by centrifugal force from said material and applying a stream of air to said material at another of said rollers.

CHARLES C. WILLIS.